Oct. 27, 1970  W. MEYER  3,536,865
SWITCH
Filed Feb. 13, 1969  2 Sheets-Sheet 1

INVENTOR
Walter Meyer
BY Hofgren, Wegner, Allen, Stellman & McCord
ATTORNEYS

Oct. 27, 1970  W. MEYER  3,536,865
SWITCH
Filed Feb. 13, 1969  2 Sheets-Sheet 2
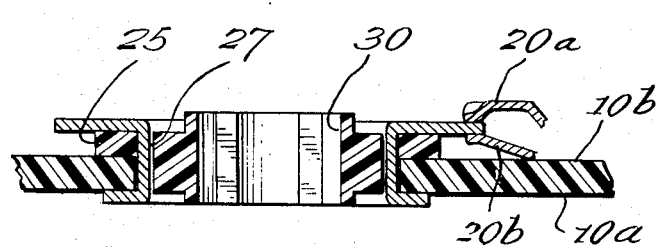
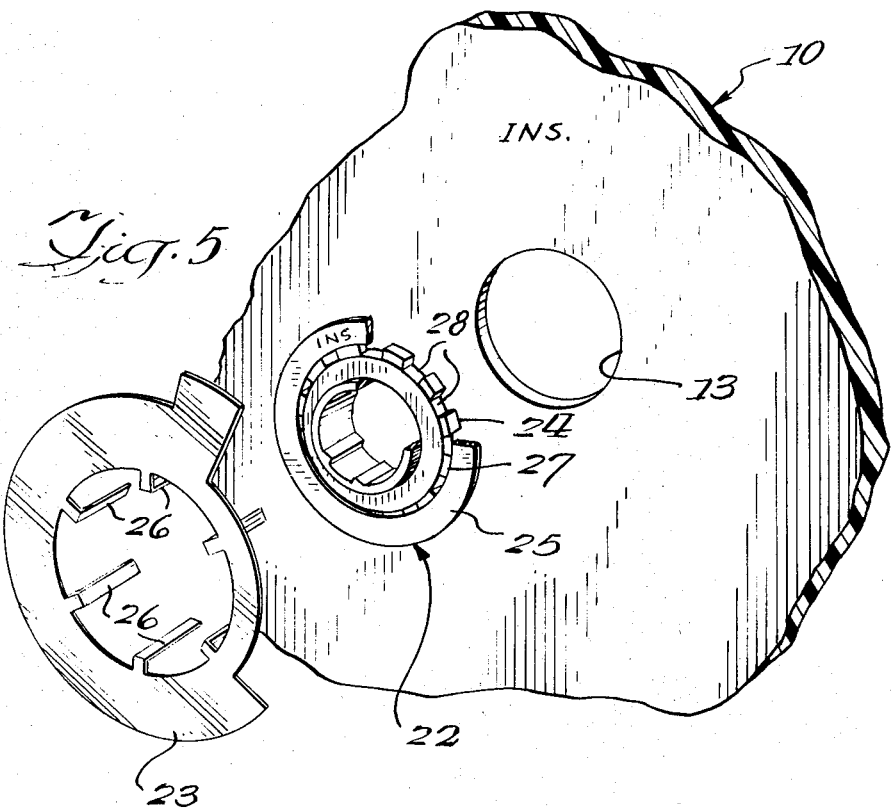
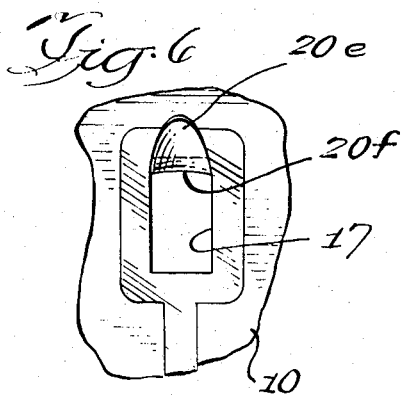
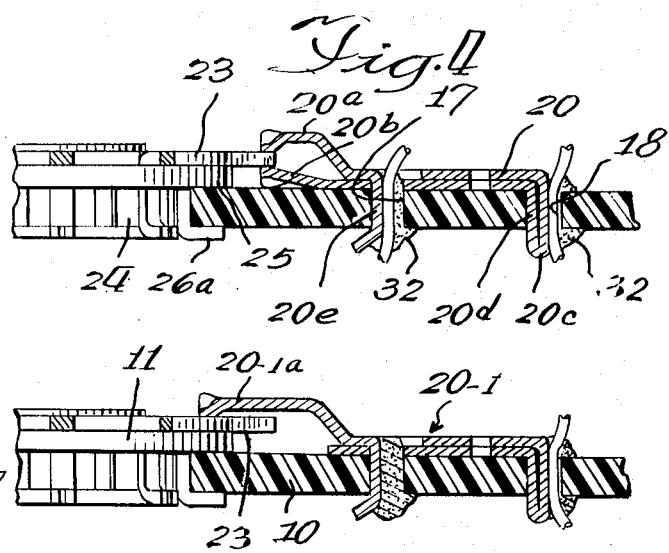

United States Patent Office 3,536,865
Patented Oct. 27, 1970

3,536,865
SWITCH
Walter Meyer, McHenry, Ill., assignor to Oak Electro/Netics Corp., a corporation of Delaware
Filed Feb. 13, 1969, Ser. No. 798,923
Int. Cl. H01h 19/58; H05k 1/04
U.S. Cl. 200—11                5 Claims

ABSTRACT OF THE DISCLOSURE

A printed circuit rotary switch with stator clips soldered thereon and having wiping surfaces spaced from the surface of the switch section. The rotor blade is mounted on a flanged body, in alignment with the wiper contacts and has legs extending through the rotor opening securing the rotor to the stator. The stator has spiral inductors for a turner printed on one surface, with the beginning terminal of one inductor radially aligned with the ending terminal of the next and joined by a stator contact.

---

This invention is concerned with a printed circuit switch particularly intended for switching inductors in a multiple frequency tuned circuit.

In a rotary switch, it is common to have a stator section of a phenolic resin insulating sheet with a rotor opening in the center and on which wiper contacts are riveted. The wiper contacts lie in radial slots extending outwardly from the rotor opening with their wiper surfaces aligned with one surface of the stator. The rotor contact blade lies flat against the surface of the stator around the rotor opening and is secured to a rotor body which has a bearing ring on the opposite surface of the stator. It is known to deposit printed circuitry directly on such switch stators. However, where size is important, as in a television tuner, the reduction of stator surface area because of the slots makes this construction undesirable.

The switch section of this invention eliminates the stator contact slots, providing maximum surface area for the printed circuitry.

One feature of the invention is that the wiper contacts are mounted on the surface of the stator with the wiping surfaces spaced from the stator surface. No slot is required, and the rotor blade is spaced from the stator surface to engage the wiper clips.

Another feature is that the circuitry is printed on one one surface of the stator and the stator contacts are on the opposite surface and have portions which extend into openings in the stator and are soldered to the circuit.

A further feature is that the circuit includes spiral inductors with the beginning terminal of one inductor aligned with the end terminal of the adjacent and connected by a stator clip extending radially outwardly from the rotor opening.

And another feature is that the rotor blade is spaced from the stator surface, as by a flange on the rotor body, the blade having legs thereon which extend through the opening in the stator and overlie the opposite stator surface to hold the rotor in place.

Figure 1:
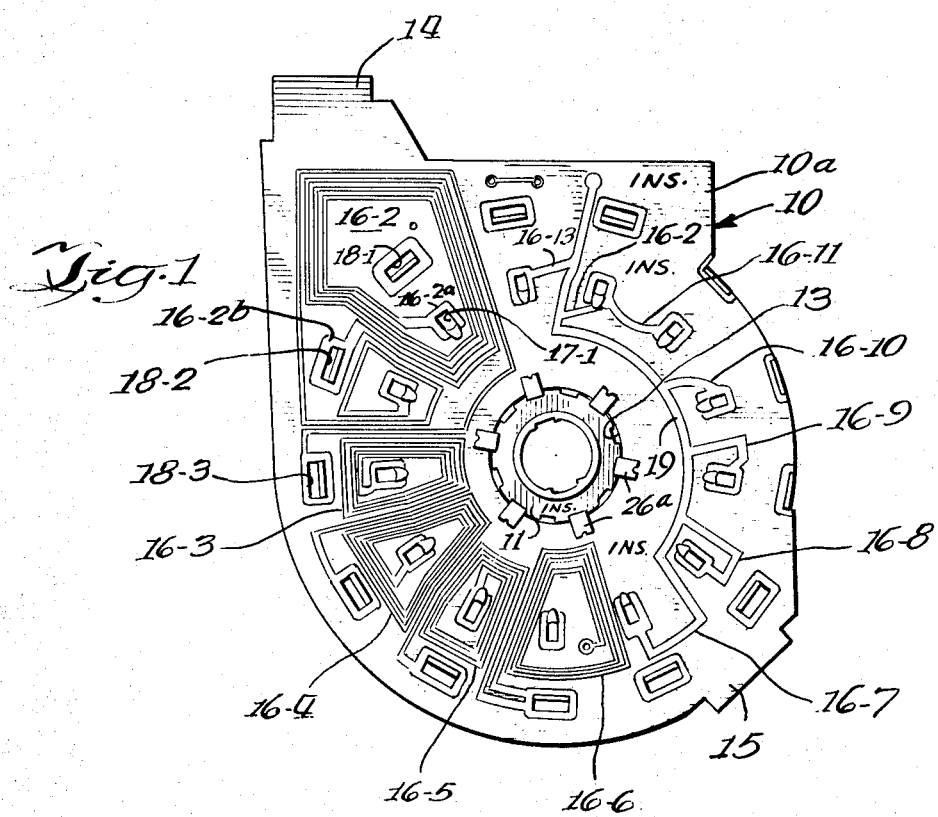
Figure 2:
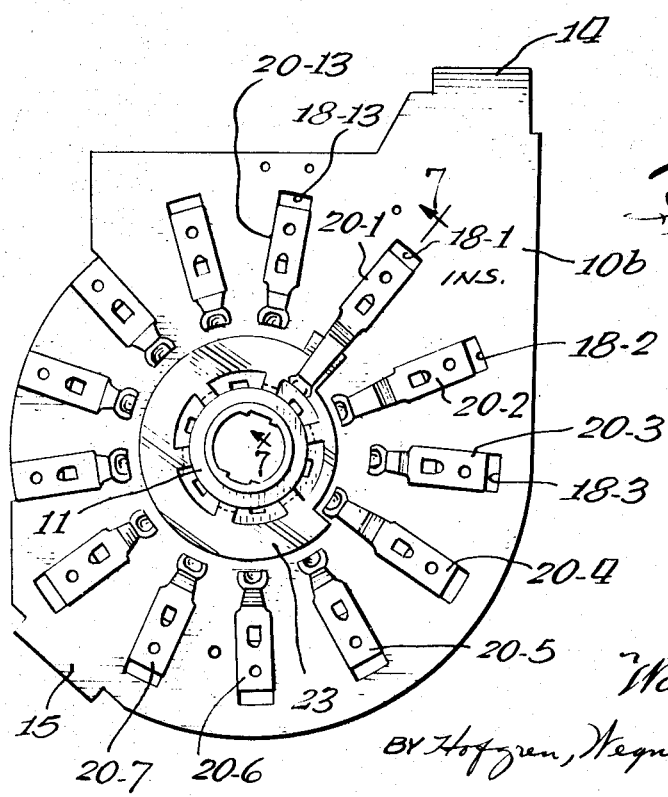

FIG. 1 is an illustration of one face of the stator (before soldering), showing the circuitry thereon;
FIG. 2 is a view of the opposite face of the stator;
FIG. 3 is an enlarged section through the rotor;
FIG. 4 is an enlarged section through a stator clip;
FIG. 5 is an exploded view of the rotor;
FIG. 6 is an enlarged, fragmentary view showing the mounting of a stator contact on the stator; and
FIG. 7 is an enlarged section along line 7—7 of FIG. 2.

The invention is illustrated in a switch section for a VHF television tuner; and certain features of the switch are particularly adapted for this use. However, some features of the switch may be used in other types of rotary switches and particularly other rotary switches having printed circuitry on the stator elements.

The switch section has a stator 10 and a rotor 11, FIGS. 1 and 2. Stator 10 is a phenolic or other insulating sheet material with a central rotor opening 13 and a pair of mounting tabs 14, 15 to be received in slots in the frame of a tuner (not shown). On the face 10a of the stator section illustrated in FIG. 1, there are a series of inductor sections 16-2 through 16-13, corresponding with the twelve VHF television channels. The inductor sections are preferably printed circuitry deposited or etched in a suitable manner. Inductor 16-2 has a spiral configuration starting at an inner terminal 16-2a and ending at an outer terminal 16-2b. Each of the terminals is defined by a conductive area surrounding an opening in the stator which also receives mounting portions of the stator contacts, as will appear. There are two sets of openings 17-1 through 17-13 and 18-1 through 18-13 with each set of openings being concentric about the rotor opening and with corresponding openings aligned radially with respect to the rotor opening. The numerical suffix for the radially aligned pairs of openings is determined by the relative position of the opening closest the rotor opening and representing the inner terminal of each of the spiral inductors. For example, the inner terminal 16-2a of conductor 16-2 is formed around opening 17-1 while the outer terminal 16-2b of the inductor is formed around opening 18-2. This pattern is continued for inductors 16-3 through 16-6 of the low frequency portion of the VHF band. Inductors 16-2 through 16-6 are connected in series by the stator contact clips, described below. Inductors 16-7 through 16-13 do not have a spiral configuration and are connected between conductor 19 and terminals at openings 17-7 through 17-13. Only a portion of the inductor terminals and openings are numbered in FIGS. 1 and 2, to indicate the pattern of identification. Applying a reference numeral to each would unnecessarily complicate the drawing.

Stator clips 20-1 through 20-13 are mounted on the face 10b of the stator, surrounding the rotor opening 13. Each of the stator clips has mounting portions extending into the appropriate mounting openings and, in the completed form of the switch section, are secured by solder, 32, FIG. 4. The stator clips have a pair of wiping contact surfaces 20a, 20b (FIG. 3) in a plane spaced from and parallel with the surface of the stator 10. This eliminates the need for slots extending outwardly from the rotor opening to receive the stator contact as in the usual switch section such as shown in Gelzer 2,954,469. The entire surface of the stator surrounding opening 13 is available for the printed circuitry.

The inner terminal 16-6a of inductor 16 is not connected with stator clip 20-6, but is formed around opening 19 for connection with another circuit element. Rotor 11 has a body 22 on which a rotor contact plate 23 is mounted. The rotor body, which may be molded of plastic, has a boss portion 24 (FIG. 4) which is received in the rotor opening 13 of the stator. A flange 25 extends outwardly beyond the rotor opening and bears against the surface of the stator. The rotor contact blade 23 overlies the flange 25 and is positioned by the flange in the plane of the contact surfaces of the stator clips, spaced from the stator surface. Rotor blade 23 has mounting legs 26 which extend through openings 27 in the flange and lie in grooves 28 in the surface of boss 24. The ends 26a of legs 26 extend outwardly along the surface 10a of the stator, cooperating with flange 25 to secure the rotor in place. A central opening 30 in the rotor receives a shaft (not shown) for turning the rotor with respect to the stator. The rotor may have a resilient wall section which accommodates dimensional variations in accordance with Ma 3,213,253.

The stator clips 20 (FIG. 4) are preferably a single length of suitable resilient contact material having (except clip 20–1) double wiping surfaces 20a, 20b formed at the ends thereof. The contact is folded at 20c and the folded portion is bent at right angles to the plane of the contact forming a first mounting portion 20d. A tang 20e extends from the contact parallel with mounting portion 20d, forming a second mounting portion intermediate the ends thereof. Mounting portion 20d is received in one of the outer mounting openings 18 while tang 20e is received in one of the inner circle of mounting openings 17. Tang 20e has a longitudinal stiffening rib 20f (FIG. 6), and is pressed into stator opening 17 with a force fit. The end of tang 20e is formed over upon insertion and engages the stator. The clip is thus held in position during assembly.

In the manufacture of the switch section, the printed circuitry is applied to the punched stator blank. The rotor is then assembled by inserting the rotor body 22 with the rotor blade 23 mounted thereon into opening 13. The ends of legs 26 are then formed outwardly to retain the rotor on the stator. With the rotor in place, the stator clips are mounted on the side of the stator opposite the printed circuitry. Long stator clip 20–1 has only an upper leaf 20–1a which engages the rotor blade 23, FIG. 7. With the rotor in the position of FIG. 2, all stator clips may be assembled on the stator board 10 by automatic insertion machinery. The lack of a lower leg on contact 20–1 avoids interference with the rotor blade.

Next additional circuit components (not shown) and connecting wires for the switch are mounted with the ends of the terminals extending through appropriate openings in the stator. The assembly is then soldered, as by dip soldering, solder 32 completing the electrical circuit between the terminals of the inductors and the stator clips, physically securing the clips in place and mechanically and electrically connecting the other components and wires (FIG. 4).

I claim:
1. A tuned circuit switch section for a multiple channel circuit, comprising:
   a switch stator of insulating material, having a rotor opening therein;
   plural spiral planar inductors on said stator, each having an inner and an outer terminal;
   stator switch clips mounted on said stator, joining the inner terminal of one inductor with the outer terminal of an adjacent inductor and having a contact portion adjacent said rotor opening;
   a rotor in said rotor opening; and
   a contact on said rotor for connecting selected stator clips.
2. The switch section of claim 1 having apertures in said stator adjacent the inductor terminal, said stator switch clips having portions extending into said apertures, and means securing said slip portions to said stator.
3. The switch section of claim 2 wherein solder secures said stator clip portions to said stator.
4. The switch section of claim 1 wherein the terminals joined by a stator clip lie on a line extending radially from said rotor opening.
5. The switch section of claim 1 wherein the inner terminals of said inductor lie on one circle concentric with said rotor opening and the outer terminals of said inductors lie on another circle concentric with said rotor opening.

References Cited

UNITED STATES PATENTS

| | | | |
|---|---|---|---|
| 2,679,596 | 5/1954 | Franklin | 250—40 |
| 2,682,643 | 6/1954 | Thias | 336—79 |
| 2,718,623 | 9/1955 | Yoder et al. | 336—192 |
| 2,786,135 | 3/1957 | Garrigus et al. | 250—20 |

ROBERT K. SCHAEFER, Primary Examiner

J. R. SCOTT, Assistant Examiner

U.S. Cl. X.R.

200—166; 317—101; 336—200